(12) United States Patent
Knudsen et al.

(10) Patent No.: US 10,859,031 B2
(45) Date of Patent: Dec. 8, 2020

(54) THERMALLY COMPENSATED BORE GUIDE SYSTEMS AND METHODS

(71) Applicant: AI ALPINE US BIDCO INC., Wilmington, DE (US)

(72) Inventors: Julian R. Knudsen, North Prairie, WI (US); Wayne G. Seaberg, Delafield, WI (US)

(73) Assignee: AI ALPINE US BIDCO INC, Wilmington, DE (US)

( * ) Notice: Subject to any disclaimer, the term of this patent is extended or adjusted under 35 U.S.C. 154(b) by 252 days.

(21) Appl. No.: 15/913,585

(22) Filed: Mar. 6, 2018

(65) Prior Publication Data

US 2019/0277221 A1 Sep. 12, 2019

(51) Int. Cl.
| | |
|---|---|
| *F02F 1/24* | (2006.01) |
| *F04B 39/12* | (2006.01) |
| *F16K 1/32* | (2006.01) |
| *F04B 27/053* | (2006.01) |
| *F04B 39/10* | (2006.01) |

(Continued)

(52) U.S. Cl.
CPC ............ *F02F 1/24* (2013.01); *F04B 27/0531* (2013.01); *F04B 39/1013* (2013.01); *F04B 39/125* (2013.01); *F16K 1/32* (2013.01); *F02F 2001/244* (2013.01); *F02F 2200/00* (2013.01);
(Continued)

(58) Field of Classification Search
CPC ...... F02F 11/005; F02F 1/24; F02F 2001/244; F02F 2200/00; F16K 1/32; F16K 17/003; F16K 31/002; F16K 31/025; F16K 99/0036; F16K 99/0038; F04B 39/125; F04B 39/1013; F04B 39/08; F04B 24/046;
(Continued)

(56) References Cited

U.S. PATENT DOCUMENTS

| 3,503,375 A | * | 3/1970 | Thompson | ............. | B22D 19/00 |
| | | | | | 123/188.3 |
| 3,585,974 A | * | 6/1971 | Weber | ..................... | F01L 1/026 |
| | | | | | 123/90.12 |

(Continued)

FOREIGN PATENT DOCUMENTS

| DE | 102008047179 A1 | 3/2010 |
| JP | H0996203 A | 4/1997 |

OTHER PUBLICATIONS

Zipkin et al., "Correlation of Exhaust-Valve Temperatures with Engine Operating Conditions and Valve Design in an Air-Cooled Cylinder", National Advisory Committee for Aeronautics, pp. 1-14, Jan. 1, 1945.

*Primary Examiner* — Umashankar Venkatesan
*Assistant Examiner* — Andrew J Rost
(74) *Attorney, Agent, or Firm* — Fletcher Yoder, P.C.

(57) ABSTRACT

A thermally compensated bore guide system for a shaft, the shaft configured to translate along a longitudinal axis, is provided. The thermally compensated bore guide system includes an inner bore defined within a component. The inner bore is configured to circumferentially surround at least a portion of the shaft, wherein the inner bore is non-linear in response to the thermally compensated bore guide system being at a first thermal condition and wherein the inner bore is configured to be linear and to define a bore axis substantially aligned with the longitudinal axis in response to the thermally compensated bore guide system being at a second thermal condition.

20 Claims, 9 Drawing Sheets

(51) Int. Cl.
 *F04B 39/08* (2006.01)
 *F04B 35/01* (2006.01)
 *F04B 27/04* (2006.01)

(52) U.S. Cl.
 CPC ............ *F04B 27/046* (2013.01); *F04B 35/01* (2013.01); *F04B 39/08* (2013.01)

(58) Field of Classification Search
 CPC . F04B 35/01; F04B 27/046; F01L 3/08; F01L 3/20; F01L 3/02; F01L 3/12
 USPC ............... 277/359, 931; 251/214; 123/41.41, 123/41.85, 188.9; 236/102
 See application file for complete search history.

(56) References Cited

U.S. PATENT DOCUMENTS

| | | | |
|---|---|---|---|
| 4,938,213 A * | 7/1990 | Tanahashi | F02B 25/145 123/193.5 |
| 5,493,776 A | 2/1996 | Kammeraad et al. | |
| 5,904,125 A | 5/1999 | Enright et al. | |
| 7,182,057 B2 | 2/2007 | Sato | |
| 7,559,302 B2 * | 7/2009 | Cullen | F01L 1/462 123/90.49 |
| 7,980,209 B2 | 7/2011 | Koneda et al. | |
| 8,663,450 B1 | 3/2014 | Kathe et al. | |
| 8,985,081 B2 | 3/2015 | Kim | |
| 9,038,592 B2 | 5/2015 | Gonsowski et al. | |
| 2003/0079708 A1 * | 5/2003 | Bruener | F02B 61/02 123/193.5 |
| 2006/0102253 A1 * | 5/2006 | Berglund | C22C 38/06 148/222 |
| 2016/0186620 A1 | 6/2016 | Knudsen | |
| 2017/0120348 A1 * | 5/2017 | Stephenson | B23C 5/109 |

* cited by examiner

THERMALLY COMPENSATED BORE GUIDE SYSTEMS AND METHODS

BACKGROUND

The field of the disclosure relates generally to bores that accommodate translating shafts therein, and more particularly to thermally compensated bore guides that guide translating shafts of a machine within such bores.

At least some known machines include shafts that translate along a longitudinal axis in a reciprocating manner. The shaft may be cylindrical, rectangular, or of any other shape. For example, but not by way of limitation, the shaft is part of an internal combustion reciprocating-piston engine, part of an air compressor, or part of any other type of machine. A bore within the machine circumferentially surrounds at least a portion of the shaft. Some known bores include a sealing system and/or guide system within the bore and circumferentially surrounding the shaft to inhibit leakage of a working fluid, such as gases from a combustion chamber, through a gap between the shaft and a sidewall of the bore, and/or to facilitate reducing wear resulting from contact between the shaft and the sidewall of the bore. For example, at least some known bores include separate inserts disposed within the bores and configured to reduce a clearance gap between the shafts and the sidewalls of the bores and to facilitate reducing friction between the sidewalls and the shafts.

In at least some known machines, a pre-set clearance gap is defined between the shaft and the sidewall of the bore, and/or between the shaft and the inserts within the bore, to enable assembly and movement of the shaft within the bore and to account at least partially for dimensional changes of the machine and the shaft during operation of the machine. However, dimensional changes of the machine during operation may be sufficiently substantial to distort the bore such that the bore sidewall contacts the shaft during operation of the machine, causing accelerated wear of the bore and the shaft. As such, at least some known machine bores have increased clearance distances between the shafts and the sidewalls of the bores. However, at least some machines incorporating increased clearance distances may exhibit increased working fluid leakage between the shaft and the sidewall due to the increased clearance distances and/or to built-up deposits, such as carbon deposits, from the working fluid, resulting in reduced efficiency of the machine and more frequent machine downtime for maintenance.

BRIEF DESCRIPTION

In one aspect, a thermally compensated bore guide system for a shaft is provided. The shaft is configured to translate along a longitudinal axis. The thermally compensated bore guide system includes an inner bore defined within a component. The inner bore is configured to circumferentially surround at least a portion of the shaft. The inner bore is non-linear in response to the thermally compensated bore guide system being at a first thermal condition, and the inner bore is configured to be linear and to define a bore axis substantially aligned with the longitudinal axis in response to the thermally compensated bore guide system being at a second thermal condition.

In another aspect, a machine is provided. The machine includes a component including a sidewall that defines an outer bore within the component, a sleeve positioned within the outer bore and at least partially defining an inner bore, and a shaft including at least a portion circumferentially surrounded by the inner bore. The shaft is configured to translate along a longitudinal axis. The inner bore is non-linear in response to the component being at a first thermal condition, and the inner bore is configured to be linear and to define a bore axis substantially aligned with the longitudinal axis in response to the component being at a second thermal condition.

In yet another aspect, a method of forming a thermally compensated bore guide system for a machine is provided. The method includes forming an inner bore defined within a component. The method also includes positioning a shaft such that at least a portion of the shaft is circumferentially surrounded by the inner bore, wherein the shaft is configured to translate along a longitudinal axis, and wherein the inner bore is non-linear in response to the component being at a first thermal condition and the inner bore is configured to be linear and to define a bore axis substantially aligned with the longitudinal axis in response to the component being at a second thermal condition.

DETAILED DESCRIPTION

The embodiments described herein overcome at least some of the disadvantages of known bore and translating shaft systems. The embodiments include a thermally compensated bore guide system for a shaft. The shaft is configured to translate along a longitudinal axis. An inner bore is defined within a component and configured to circumferentially surround at least a portion of the shaft. The inner bore is non-linear in response to the thermally compensated bore guide system being at a first thermal condition. Additionally, the inner bore is configured to be linear and to define a bore axis substantially aligned with the longitudinal axis in response to the thermally compensated bore guide system being at a second thermal condition. For example, the second thermal condition represents a steady-state operating condition, and the inner bore becomes linear as a result of thermal expansion of the machine and the thermally compensated bore guide system to facilitate reducing wear that occurs between the shaft and the inner bore during operation of the machine. Additionally or alternatively, in certain embodiments, the thermally compensated bore guide system includes a sidewall of the component defining an outer bore within the component and a sleeve at least partially defining the inner bore and positioned within the outer bore. The hollow inner sleeve may facilitate inclusion of at least a second material having wear or thermal properties that are different from a first material of the component. In at least some embodiments, one of the inner sleeve bore and the outer bore is non-linear at the first thermal condition and linear at the second thermal condition to facilitate cooperating with the thermally compensated bore guide system to reduce wear of the shaft and the inner bore and to reduce fluid leakage between the shaft and the inner bore.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
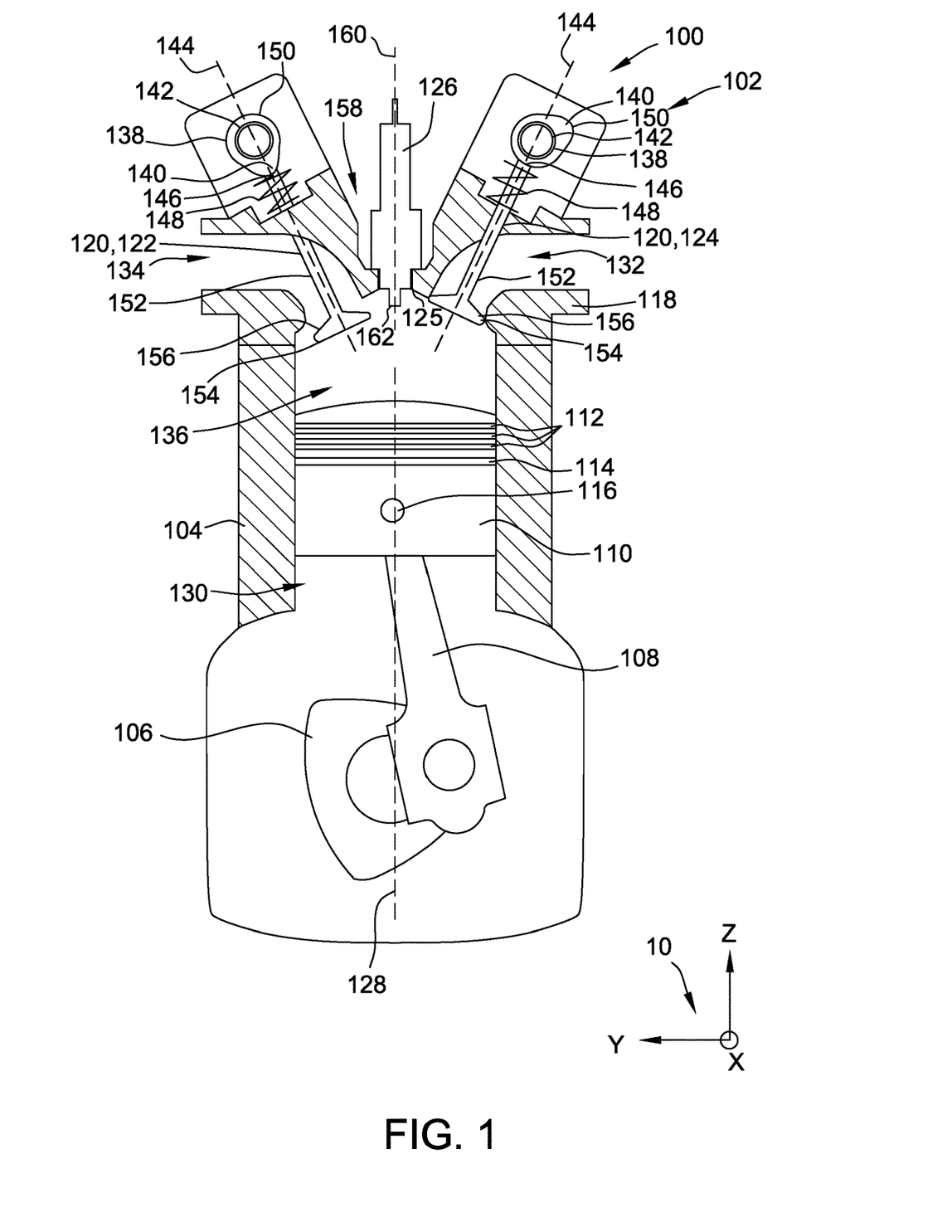
FIG. 1 is a cross-sectional side view of an exemplary machine.

FIG. 1 is a cross-sectional side view of an exemplary machine 100. A coordinate system 10 includes a horizontal, X-axis, a lateral, Y-axis, and a vertical, Z-axis, the three axes orthogonal to each other. In the exemplary embodiment, machine 100 is an internal combustion, spark-ignition, reciprocating-piston, four-stroke engine. That is, machine 100 utilizes an induction stroke, a compression stroke, a combustion stroke, and an exhaust stroke to complete a full power cycle. In an alternative embodiment, machine 100 is a compression ignition, reciprocating-piston, four-stroke engine. In another alternative embodiment, machine 100 is a reciprocating-piston two-stroke engine. In alternative embodiments, machine 100 is a reciprocating-piston air compressor. Alternatively, machine 100 is any other internal combustion engine and/or reciprocating-piston machine, including, without limitation, a radial engine, a pump, and/or any other machine. Moreover, the present embodiments are not limited to only being used in reciprocating-piston machines, but rather can be used in any other suitable machine that includes translating shafts that are retained at least partially within a bore.

In the exemplary embodiment, machine 100 includes a cylinder head assembly 102, an engine block 104, a crank 106, a connecting rod 108, a piston 110 including a plurality of combustion rings 112 and an oil ring 114, and a wrist pin 116 coupling piston 110 and connecting rod 108. Cylinder head assembly 102 includes a cylinder head 118 including a pair of valves 120 including an exhaust valve 122 and an intake valve 124, a spark plug sleeve 125, and a spark plug 126. Piston 110 is configured to translate in a reciprocating cyclical manner along a cylinder bore axis 128 within a cylinder bore 130 of engine block 104, as is known in the art.

In alternative embodiments, machine 100 may include any other components that facilitate operation of machine 100 as described herein.

In the exemplary embodiment, cylinder head 118 includes an intake port 132 and an exhaust port 134. A cylindrical combustion chamber 136 is defined between piston 110 and cylinder head 118. It should be understood that in some embodiments the term "cylindrical" applies to only an approximate degree, as would be recognized by one of ordinary skill in the art, rather than to an absolute or perfect degree. In alternative embodiments, combustion chamber 120 has any suitable shape that enables machine 100 to function as described herein.

In the exemplary embodiment, cylinder head assembly 102 is an overhead camshaft cylinder head assembly 102 and includes camshafts 138 including cam lobes 140. In an alternative embodiment, cylinder head assembly 102 is an overhead valve, camshaft-in-block type cylinder head assembly 102. In further alternative embodiments, cylinder head assembly 102 is any type of cylinder head assembly that facilitates operation of machine 100 as described herein. Camshafts 138 are configured to rotate about a camshaft rotation axis 142 causing cam lobes 140 to exert a force upon valves 120 to cause valves 120 to translate along a respective valve longitudinal axis 144 within cylinder head 118. More specifically, an upper portion 146 of each valve 120 is held against a respective cam lobe 140 by a valve spring 148 and follows an outer profile 150 of cam lobe 140 as camshaft 138 rotates about camshaft rotation axis 142, causing a valve stem 152 of valve 120 to translate along valve longitudinal axis 144 within cylinder head 118 and a valve head 154 of valve 120 to travel into, and return from, combustion chamber 136.

In the exemplary embodiment, cylindrical valve stem 152 is coupled to valve head 154. Valve head 154 includes a valve seat 156 configured to facilitate valve head 154 sealingly interfacing with a respective one of intake port 132 and exhaust port 134. Valves 120 are coupled in flow communication with combustion chamber 136 via intake port 132 and exhaust port 134. More specifically, intake valve 124 is operable to supply an enrichment gas to combustion chamber 136 to facilitate ignition within combustion chamber 136 at the preselected energy capacity supplied by spark plug 126. Exhaust valve 122 is operable to facilitate evacuation of combustion gases from combustion chamber 136 during the exhaust stroke of machine 100. In alternative embodiments, valves 120 may be configured in any suitable manner that facilitates operation of machine 100 as described herein.

In the exemplary embodiment, cylinder head 118 includes a spark plug socket 158 defined by cylinder head 118. Spark plug socket 158 extends through cylinder head 118 along a socket axis 160 and is configured to maintain a position of spark plug sleeve 125 and spark plug 126 within cylinder head 118 and combustion chamber 136. In the exemplary embodiment, spark plug socket 158 is symmetric about socket axis 160. In alternative embodiments, spark plug socket 158 is other than symmetric about socket axis 160. In the exemplary embodiment, spark plug 126 includes an electrode assembly 162 in flow communication with combustion chamber 136. Electrode assembly 162 is suitably configured to supply energy at a preselected capacity to ignite a fuel/air mixture within combustion chamber 136.

Figure 2:
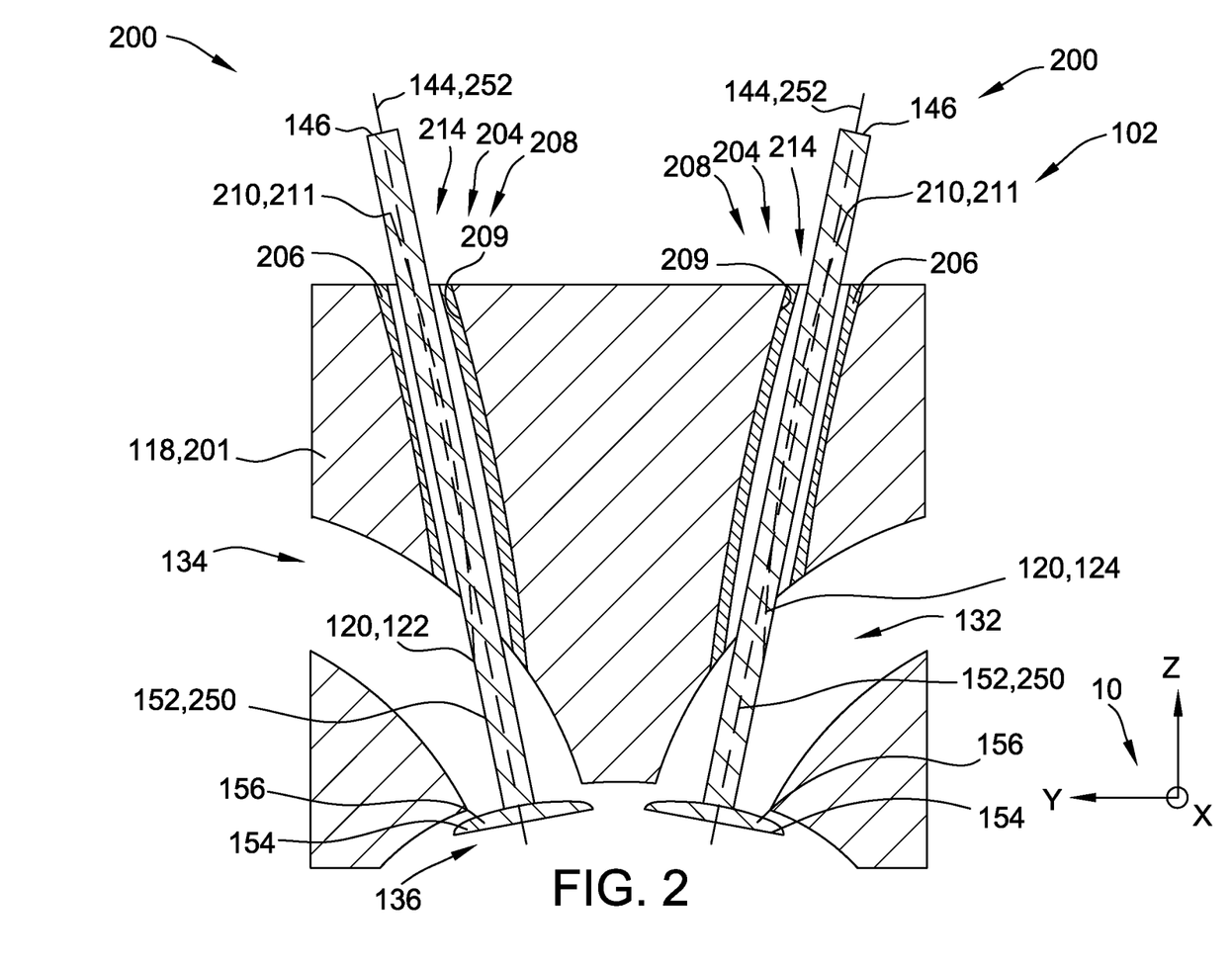
FIG. 2 is a cross-sectional view of an exemplary cylinder head that may be used with the machine shown in FIG. 1 illustrating exemplary thermally compensated bore guide systems at an exemplary first thermal condition.
Figure 3:
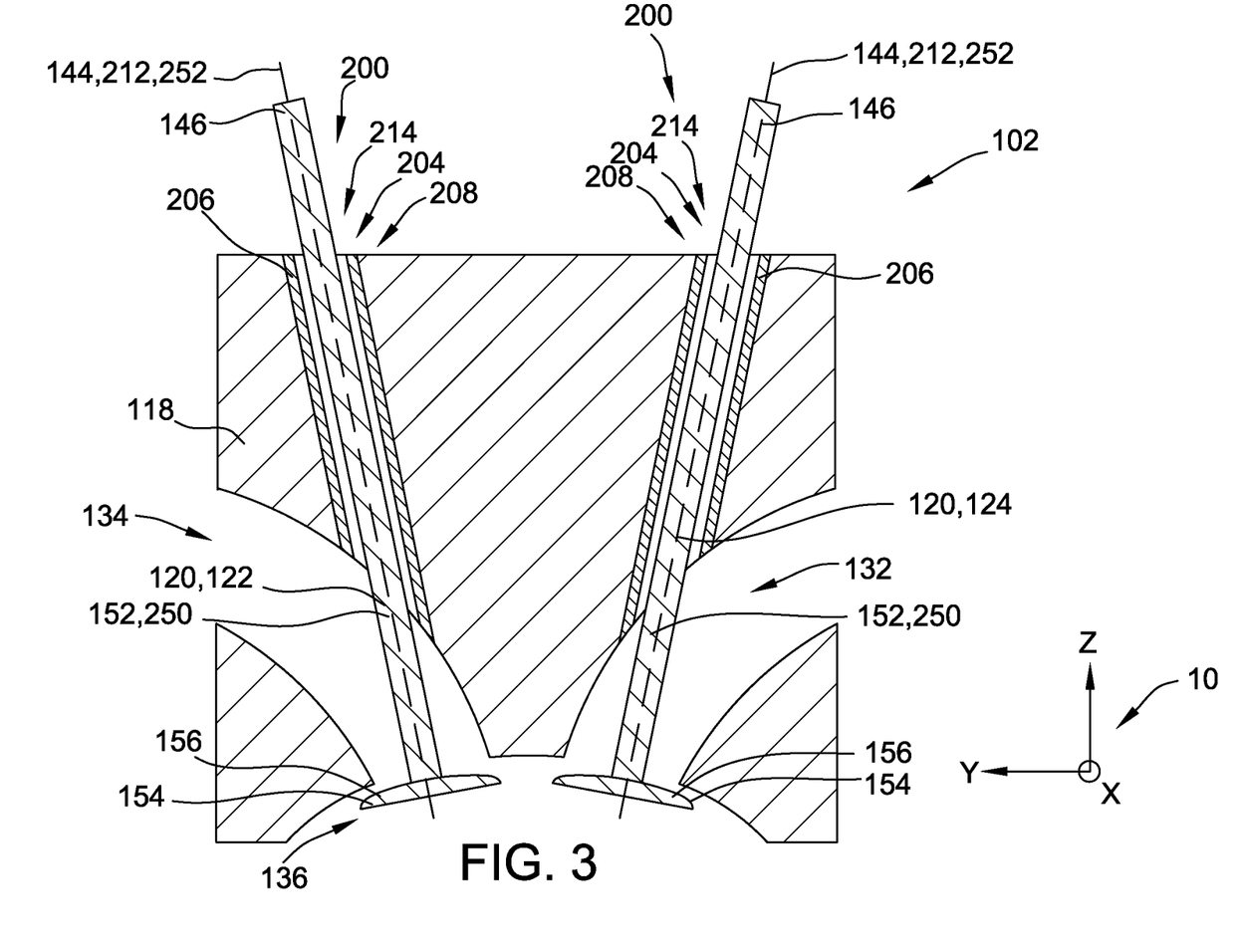
FIG. 3 is a cross-sectional side view of the cylinder head shown in FIG. 2 illustrating the thermally compensated bore guide systems at an exemplary second thermal condition.
Figure 4:
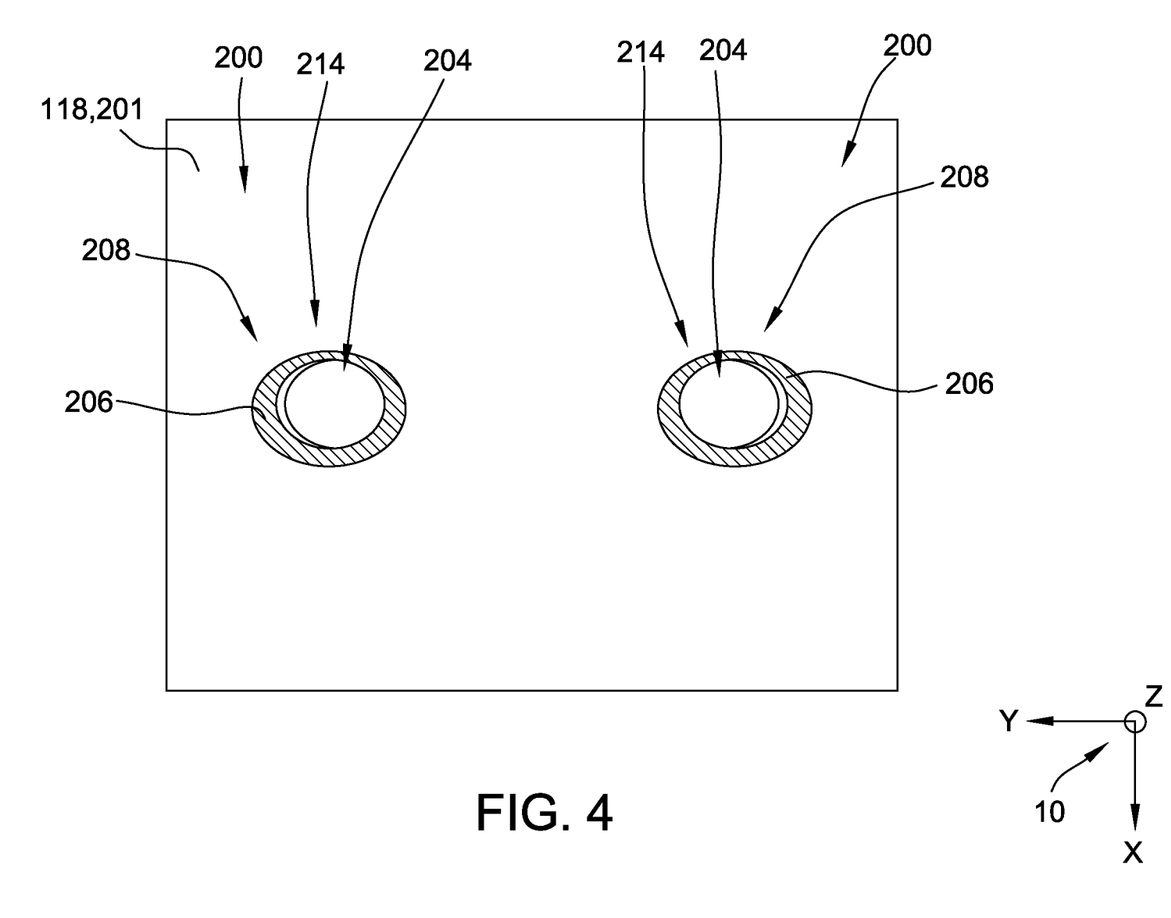
FIG. 4 is a plan view of the cylinder head shown in FIG. 2 illustrating the thermally compensated bore guide systems at the first thermal condition.

FIG. 2 is a cross-sectional view of a component 201 that may be used with machine 100 (shown in FIG. 1) illustrating a pair of exemplary thermally compensated bore guide systems 200 at an exemplary first thermal condition. FIG. 3 is a cross-sectional side view of component 201 illustrating thermally compensated bore guide systems 200 at an exemplary second thermal condition. FIG. 4 is a plan view of component 201 illustrating thermally compensated bore guide systems 200 at the first thermal condition. In the exemplary embodiment, component 201 is embodied as cylinder head 118 of machine 100. In alternative embodiments, component 201 is embodied as any suitable component of any suitable machine that enables thermally compensated bore guide system 200 to function as described herein.

Thermally compensated bore guide system 200 is configured to circumferentially surround at least a portion of a shaft 250. Moreover, shaft 250 is configured to translate along a shaft longitudinal axis 252. It should be understood that the term "along" as used herein indicates that shaft 250 is configured to translate approximately parallel to shaft longitudinal axis 252, as would be recognized by one of ordinary skill in the art, rather than parallel to an absolute or perfect degree. In the exemplary embodiment, each shaft 250 is embodied as one of valve stems 152, wherein each valve stem 152 is configured to translate along valve longitudinal axis 144. In alternative embodiments, shaft 250 is embodied as any suitable shaft that enables thermally compensated bore guide system 200 to function as described herein. Each thermally compensated bore guide system 200 defines an inner bore 204 within component 201. Inner bore 204 is configured to circumferentially surround at least a portion of shaft 250.

In FIG. 2, component 201 and thermally compensated bore guide systems 200 coupled thereto are illustrated at a first thermal condition, i.e., a first temperature. In the exemplary embodiment, the first thermal condition is associated with a resting, i.e. non-operating, and/or initial startup condition of machine 100. In alternative embodiments, the first thermal condition is associated with any suitable condition of machine 100 and/or component 201. In response to component 201 and thermally compensated bore guide system 200 being at the first thermal condition, inner bore 204 of thermally compensated bore guide system 200 has a first geometry that is non-linear. More specifically, in the exemplary embodiment, at the first thermal condition, each inner bore 204 has a curvilinear shape defining a radius 210. In alternative embodiments, inner bore 204 is composed of a series of curvilinear shapes defining a plurality of radii 210 along its longitudinal extent. In other alternative embodiments, inner bore 204 has any other non-linear shape that enables thermally compensated bore guide system 200 to function as described herein. For example, inner bore 204 includes at least one linear portion and at least one non-linear portion in series.

In FIG. 3, component 201 and thermally compensated bore guide systems 200 coupled thereto are illustrated at a second thermal condition, i.e. a second temperature. In the exemplary embodiment, the second thermal condition is associated with a steady-state operating condition of machine 100. In alternative embodiments, the second thermal condition is associated with any suitable condition of machine 100 and/or component 201. In response to component 201 and thermally compensated bore guide system 200 being at the second thermal condition, inner bore 204 of thermally compensated bore guide system 200 has a second geometry that is linear. More specifically, in the exemplary embodiment, at the second thermal condition, each inner bore 204 defines a bore axis 212 that is aligned with the respective shaft longitudinal axes 252 when thermally compensated bore guide systems 200 are at the second thermal condition. It should be understood that the term "aligned" as used herein indicates that bore axis 212 is approximately parallel to shaft longitudinal axis 252 along the entire portion of shaft 250 that is received in inner bore 204, as would be recognized by one of ordinary skill in the art, rather than parallel to an absolute or perfectly degree. For example, bore axis 212 is recognizable by one of ordinary skill as linear in comparison to the non-linear shape of inner bore 204 at the first thermal condition. Thus, thermally compensated bore guide system 200 facilitates reducing wear resulting from mechanical interaction between shaft 250 and inner bore 204 by providing dimensions of inner bore 204 that become more linear in response to thermal expansion during operation of machine 100, rather than less linear as in at least some known systems.

In the exemplary embodiment, thermally compensated bore guide system 200 includes an outer bore 208 defined in component 201. More specifically, outer bore 208 is defined by a sidewall 209 of component 201 that circumscribes shaft 250. Also in the exemplary embodiment, thermally compensated bore guide system 200 includes a sleeve 206 positioned within outer bore 208. Sleeve 206 is a thin-walled hollow member. More specifically, an exterior surface of sleeve 206 is coupled against sidewall 209, and a sleeve bore 214 of sleeve 206 at least partially defines inner bore 204. In an alternative embodiment, outer bore 208 defining inner bore 204. In other alternative embodiments, outer bore 208 and inner bore 204 are configured in any suitable manner that facilitates operation of thermally compensated bore guide system 200 as described herein.

In the exemplary embodiment, the sizes, positions, and dimensions of each thermally compensated bore guide system 200 within component 201 at the first thermal condition are selected by calculating an expected thermal expansion of component 201 and an expected thermal expansion of thermally compensated bore guide system 200 for a given change in temperature from the first thermal condition to the second thermal condition, such as by using Finite Element Methods (FEM) (also referred to as Finite Element Analysis). More specifically, thermally compensated bore guide system 200 is sized and positioned within component 201 such that the combined thermal expansion of component 201 and thermally compensated bore guide system 200 results in the desired dimensional qualities discussed herein when thermally compensated bore guide system 200 transitions from the first thermal condition to the second thermal condition. In the exemplary embodiment, the first thermal condition is representative of a startup or "cold" condition of machine 100 and the second thermal condition is representative of an operational or steady-state condition of machine 100. More specifically, the first thermal condition represents a first temperature and the second thermal condition represents a second temperature, wherein the second temperature is greater than the first temperature. In the exemplary embodiment, during an expected standard service life, machine 100 will be at the second thermal condition for a greater amount of time than it will be at the first thermal condition. Accordingly, sizing thermally compensated bore guide system 200 to account for the thermal expansion of component 201 such that desired dimensional properties of component 201 occur at the second thermal condition facilitates reducing wear of component 201 and shaft 250. In alternative embodiments, the first thermal condition and the second thermal condition may be representative of any temperatures that facilitate operation of thermally compensated bore guide systems as described herein.

In the exemplary embodiment, the thermal expansion of a material along a given dimension, ΔL, is related to the coefficient of linear thermal expansion of a material, α, the change in temperature, ΔT, and the value of the dimension in question, L, at least partially through the following equation:

$$\Delta L = \alpha L \Delta T \qquad \text{Eq. 1}$$

Using at least the above equation, FEM is performed on component 201 in a solid modeling program by examining a plurality of discrete portions of component 201, for example, to determine a plurality of first dimensions that component 201 must have at the first thermal condition in order to yield a desired second plurality of dimensions for thermally compensated bore guide system 200 at the second thermal condition. In an alternative example, the thermal expansion of component 201 is calculated using any method that enables thermally compensated bore guide system 200 to function as described herein.

Figure 5:
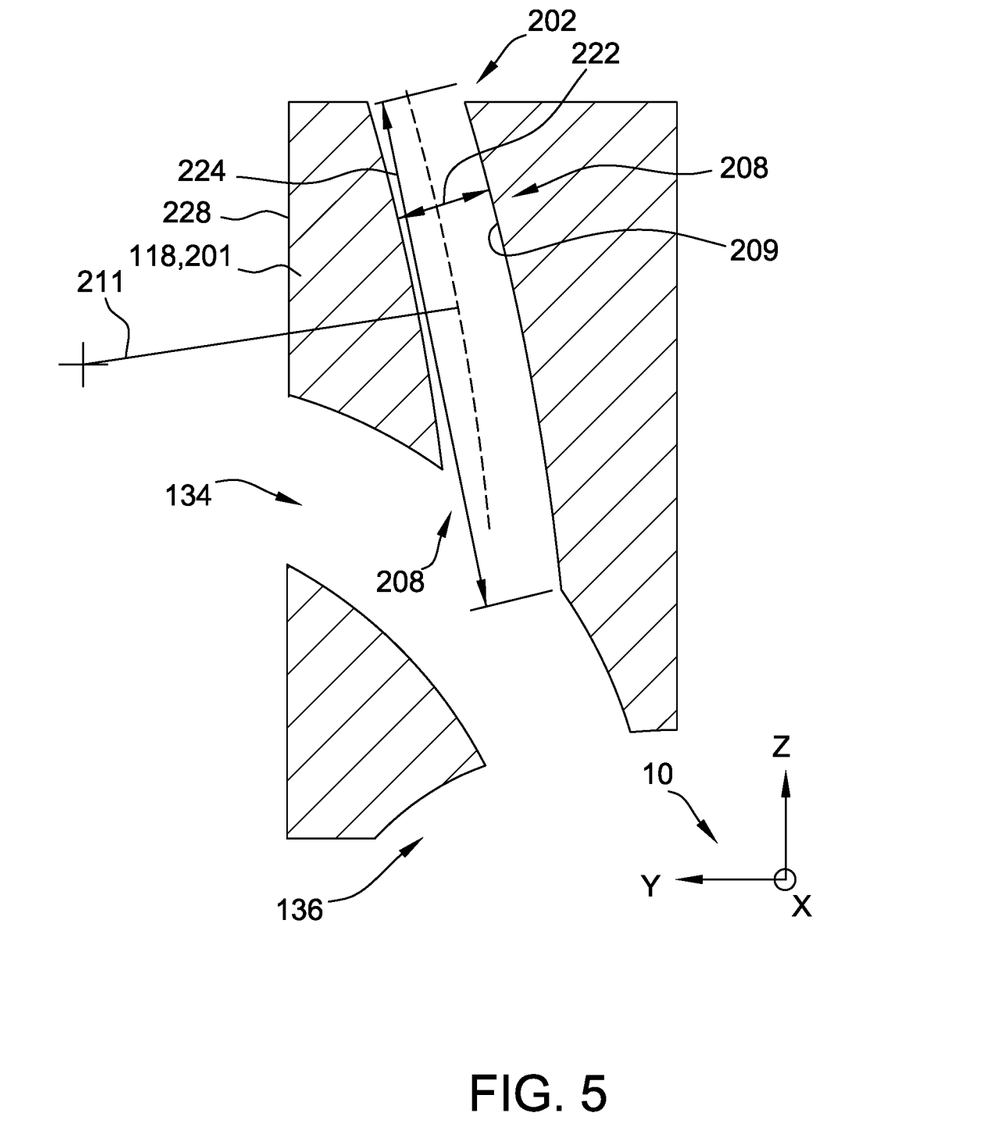
FIG. 5 is a cross-sectional side view of a portion of the cylinder head shown in FIG. 2 illustrating an exemplary outer bore.
Figure 6:
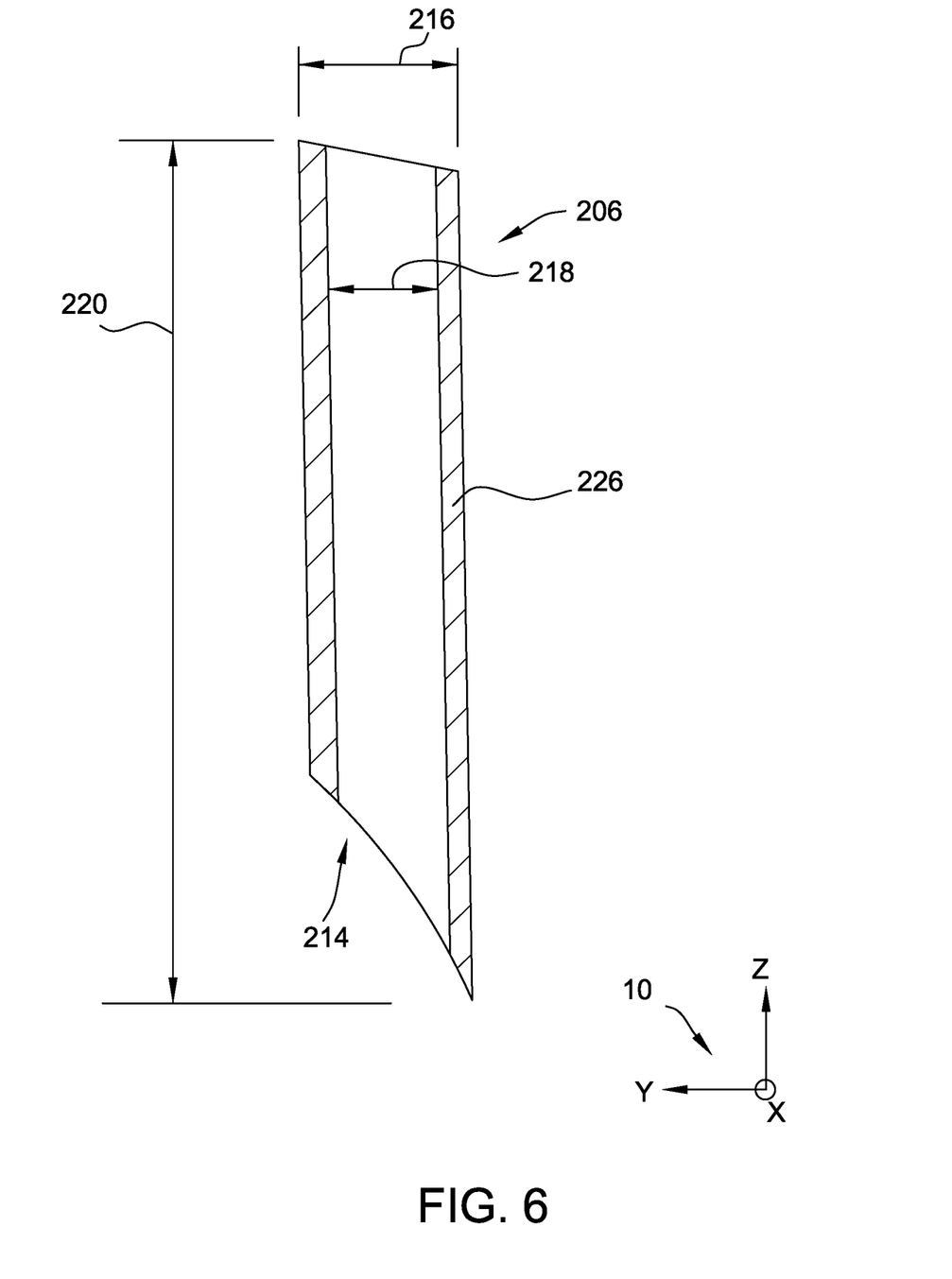
FIG. 6 is cross-sectional side view of an exemplary sleeve that may be used with the outer bore shown in FIG. 5.

FIG. 5 is a cross-sectional side view of a portion of component 201, embodied as cylinder head 118 (shown in FIG. 2), illustrating outer bore 208. FIG. 6 is a cross-sectional side view of sleeve 206 for use with outer bore 208 (shown in FIG. 5). In the exemplary embodiment, outer bore 208 is illustrated at the first thermal condition and has a non-linear shape. Sleeve 206 is illustrated at the first thermal condition, prior to insertion into outer bore 208, and defines sleeve bore 214 having a linear shape. In the exemplary embodiment, sleeve 206 is configured to be positioned within outer bore 208, causing sleeve 206 to deform in conformance to the non-linear shape of outer bore 208 at the first thermal condition. More specifically, sleeve 206 positioned in outer bore 208 at the first thermal condition deforms such that sleeve bore 214 becomes non-linear at the first thermal condition. Moreover, sleeve bore 214 at least partially defines inner bore 204. Outer bore 208 is sized and dimensioned such that upon experiencing thermal deformation, due to transitioning from the first thermal condition to the second thermal condition, outer bore 208 becomes linear at the second thermal condition. Sidewall 209 bears on the exterior of sleeve 206, which in combination with the thermal deformation of sleeve 206, causes sleeve bore 214, which also forms inner bore 204, to also become linear at the second thermal condition.

In the exemplary embodiment, sleeve 206 has a sleeve outer diameter 216 and an inner sleeve length 220. Sleeve bore 214 has a sleeve bore diameter 218. Outer bore 208 has an outer bore diameter 222, an outer bore length 224, and a curvilinear shape defining an outer bore radius 211. In the exemplary embodiment, outer bore diameter 222 and sleeve outer diameter 216 are sized to couple sleeve 206 within outer bore 208 in an interference fit when sleeve 206 is positioned within outer bore 208. More specifically, in the exemplary embodiment, sleeve outer diameter 216 in a pre-insertion state is slightly larger than outer bore diameter 222, resulting in a press fit between sleeve 206 and outer bore 208. In alternative embodiments, sleeve 206 is retained within outer bore 208 using a mechanical lock and/or interface between sleeve 206 and outer bore 208. In other alternative embodiments, sleeve 206 is tapered such that at least a portion of sleeve 206 is configured to have an interference fit relationship with outer bore 208. In further alternative embodiments, sleeve 206 and outer bore 208 are configured in any suitable manner that enables thermally compensated bore guide system 200 to function as described herein.

In the exemplary embodiment, sleeve 206 is formed from a first material 226 and sidewall 209 of component 201 is formed from a second material 228 that is different from first material 226. In alternative embodiments, first material 226 and second material 228 are the same material. In further alternative embodiments, sleeve 206 is formed from at least two different materials positioned within sleeve 206, including a third material, to facilitate reducing wear occurring between sleeve 206 and shaft 250 during operation of machine 100 at at least one of the first thermal condition and the second thermal condition. In the exemplary embodiment, first material 226 is a wear-resistant austenitic stainless steel alloy. In alternative embodiments, first material 226 is one of a wear-resistant cobalt-steel alloy, a cast iron alloy, a nickel-steel alloy, a titanium alloy, an Inconel alloy, and a bronze alloy. In the exemplary embodiment, second material 228 is a thermally conductive aluminum alloy. In alternative embodiments, second material 228 is a cast iron alloy. In further alternative embodiments, each of sleeve 206 and sidewall 209 of component 201 is fabricated from any type of material that enables thermally compensated bore guide system 200 to function as described herein.

In the exemplary embodiment, thermally compensated bore guide system 200 includes a single, continuous sleeve 206 extending along and coterminous with outer bore length 224. In alternative embodiments, sleeve 206 extends out of and beyond outer bore 208 by any distance that enables thermally compensated bore guide system 200 to function as described herein. In other alternative embodiments, sleeve 206 includes a pair of sections inserted into outer bore 208 from opposing directions and positioned in a serial relationship within outer bore 208. In further alternative embodiments, thermally compensated bore guide system 200 includes any suitable number of sections of sleeve 206 positioned in any suitable fashion that enables thermally compensated bore guide system 200 to function as described herein.

Figure 7:
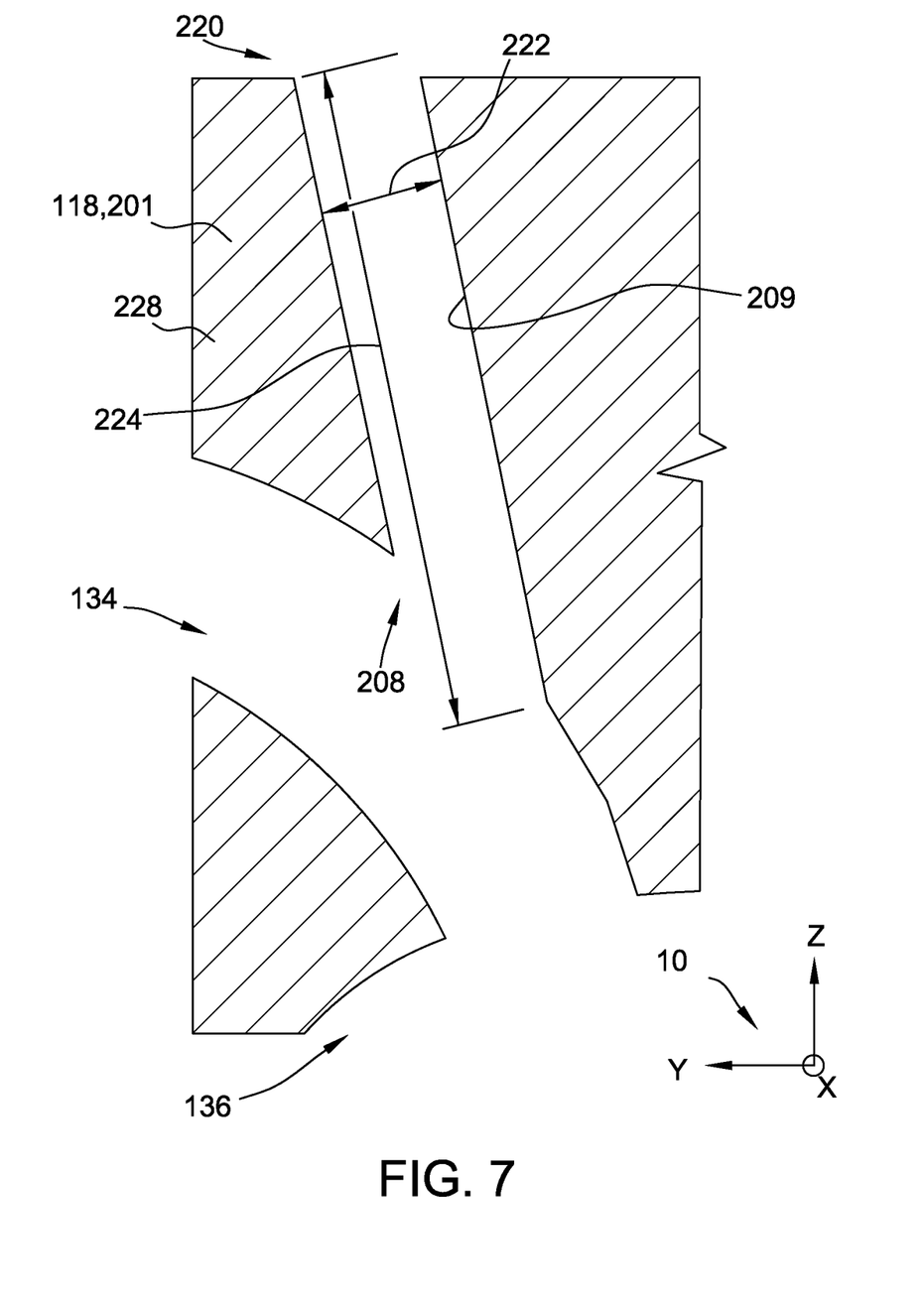
FIG. 7 is a cross-sectional side view of a portion of an alternative embodiment of the cylinder head shown in FIG. 5 illustrating an exemplary outer bore having a linear shape at the first thermal condition.
Figure 8:
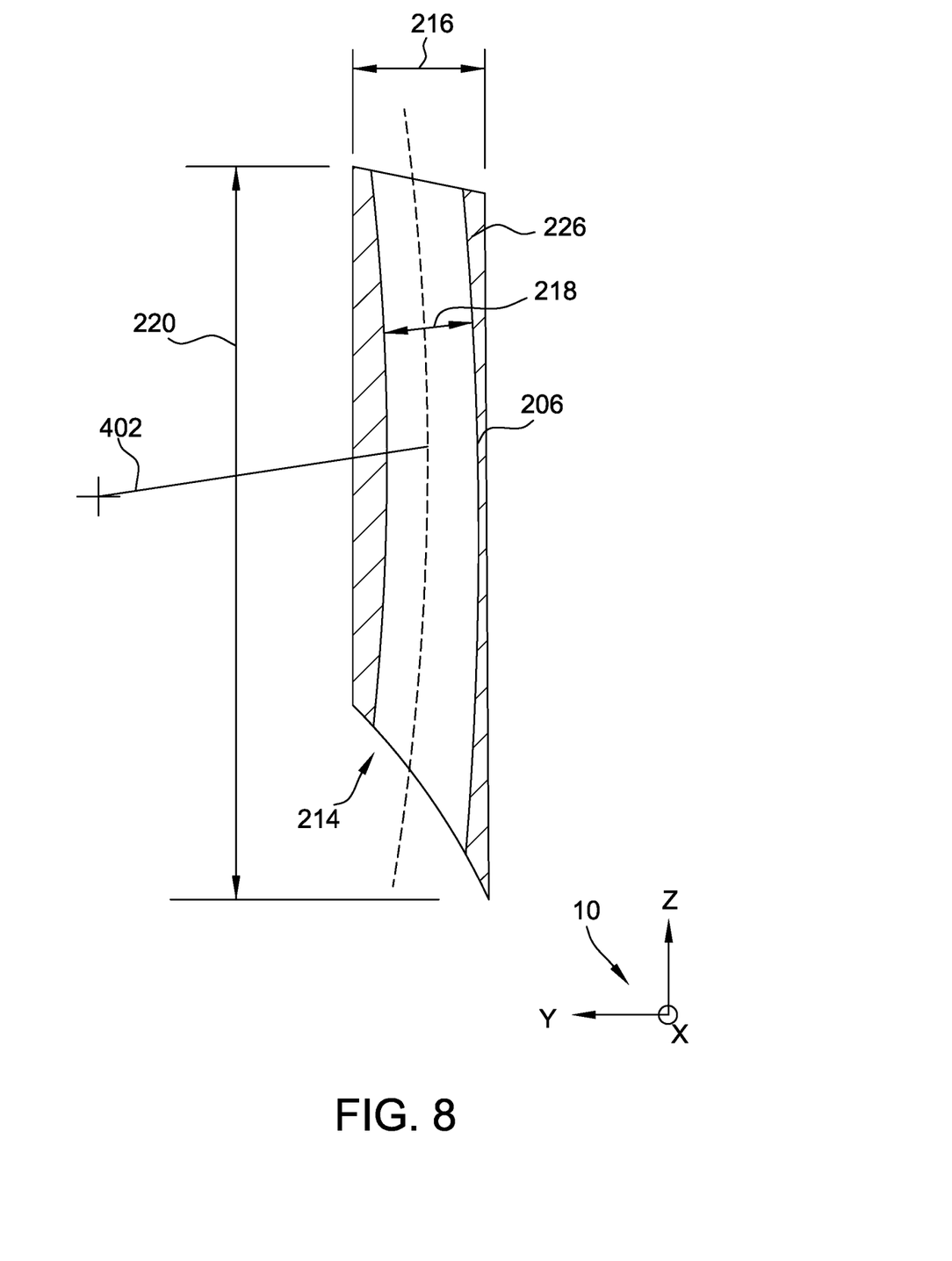
FIG. 8 is a cross-sectional side view of an alternative embodiment of a sleeve for use with the outer bore in FIG. 7.

FIG. 7 is a cross-sectional side view of a portion of an alternative embodiment of component 201, embodied as cylinder head 118 (shown in FIG. 2), illustrating outer bore 208 having a linear shape at the first thermal condition. FIG. 8 is a cross-sectional side view of an alternative embodiment of sleeve 206 illustrating sleeve bore 214 having a non-linear shape at the first thermal condition. The embodiment shown in FIGS. 7 and 8 is substantially identical to the embodiment shown in FIGS. 5 and 6, except that outer bore 208 has a linear shape, and sleeve bore 214 has a non-linear shape defining a sleeve bore radius 402, at the first thermal condition. In the exemplary embodiment, sleeve 206 is configured to be inserted into linear outer bore 208 at the first thermal condition. Outer bore 208 of thermally compensated bore guide system 200 is sized and dimensioned such that upon experiencing thermal deformation, as a result of thermally compensated bore guide system 200 transitioning from the first thermal condition to the second thermal condition, outer bore 208 becomes non-linear at the second thermal condition. Sidewall 209 bears on the exterior of sleeve 206, which in combination with the thermal deformation of sleeve 206, causes sleeve bore 214, which also forms inner bore 204, to become linear at the second thermal condition.

Figure 9:
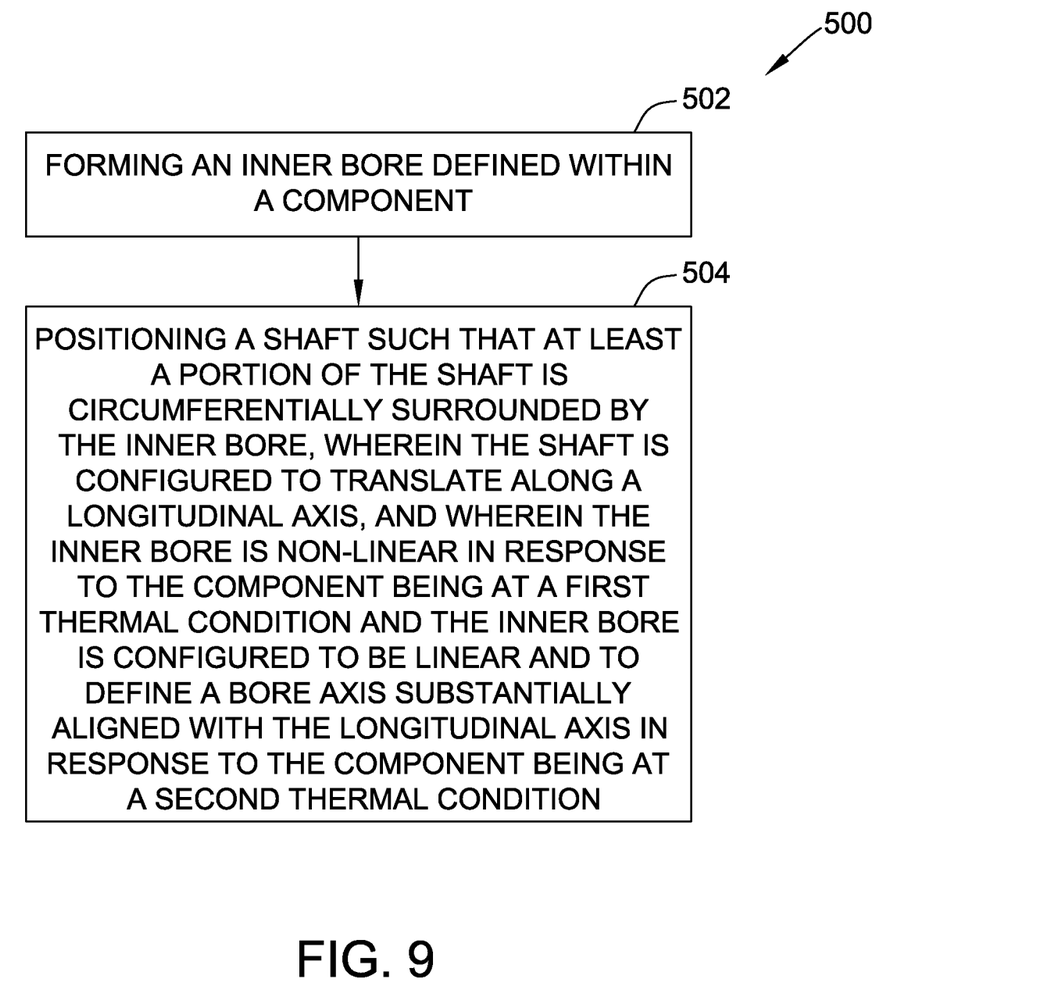
FIG. 9 is a flow diagram of an exemplary method for forming a thermally compensated bore guide system, such as the thermally compensated bore guide system shown in FIG. 2.

FIG. 9 is a flow diagram of an exemplary method 500 of forming a thermally compensated bore guide system for a machine, such as thermally compensated bore guide system 200 (shown in FIG. 2). Method 500 includes forming 502 an inner bore, such as inner bore 204, defined within a component, such as component 201. Method 500 also includes positioning 504 a shaft, such as shaft 250, such that at least a portion of the shaft is circumferentially surrounded by the inner bore, wherein the shaft is configured to translate along a longitudinal axis, such as shaft longitudinal axis 252, and wherein the inner bore is non-linear in response to the component being at a first thermal condition and the inner bore is configured to be linear and to define a bore axis, such as bore axis 212, substantially aligned with the longitudinal axis in response to the component being at a second thermal condition.

In some embodiments, the thermally compensated bore guide system includes an inner sleeve, such as inner sleeve 206, and the step of forming 502 the inner bore includes forming an outer bore, such as outer bore 208, in the component and positioning the hollow inner sleeve within the outer bore. In certain embodiments, the step of forming 502 the inner bore includes forming the hollow inner sleeve wherein the inner bore of the hollow inner sleeve is non-linear in response to the hollow inner sleeve being at the first thermal condition.

In some embodiments, the step of forming 502 the inner bore includes using a ram electrical discharge (EDM) machining process to remove material from the thermally compensated bore guide system to form the non-linear inner bore of the component. In certain embodiments, the step of forming 502 the inner bore includes using the ram EDM process to form the non-linear outer bore in the component. In some embodiments, the step of forming 502 the inner bore includes using the ram EDM process to remove material from an inner sleeve to form the non-linear inner bore in the hollow inner sleeve. In other certain embodiments, the step of forming 502 the inner bore includes first using the ram EDM process to remove material from the thermally compensated bore guide system to form an undersized non-linear inner bore and then completing the non-linear inner bore using an additional machining process such as drilling and/or reaming, for example. In alternative embodiments, the step of forming 502 the inner bore may include using any other type of electrical discharge machining process that facilitates forming the thermally compensated bore guide system as described herein.

In some embodiments, the step of forming 502 the inner bore includes additively manufacturing the component such that the component defines the non-linear inner bore at the first thermal condition. In certain embodiments, the step of forming 502 the inner bore includes additively manufacturing the component such that the component defines the non-linear outer bore at the first thermal condition. In some embodiments, the inner sleeve may be formed using an additive manufacturing process. In alternative embodiments, the step of forming 502 the inner bore may include using any other type of additive manufacturing process in conjunction with any other type of conventional manufacturing process that facilitates forming the thermally compensated bore guide system as described herein.

The above-described embodiments of thermally compensated bore guide systems overcome at least some of the disadvantages of known bore and translating shaft systems. Specifically, the embodiments include a thermally compensated bore guide system for a shaft. The shaft is configured to translate along a longitudinal axis. An inner bore is defined within a component and configured to circumferentially surround at least a portion of the shaft. The inner bore is non-linear in response to the thermally compensated bore guide system being at a first thermal condition. Additionally, the inner bore is configured to be linear and to define a bore axis substantially aligned with the longitudinal axis in response to the thermally compensated bore guide system being at a second thermal condition. For example, the second thermal condition represents a steady-state operating condition, and the inner bore becomes linear as a result of thermal expansion of the machine and the thermally compensated bore guide system to facilitate reducing wear that occurs between the shaft and the inner bore during operation of the machine. Additionally or alternatively, in certain embodiments, the thermally compensated bore guide system includes a sidewall of the component defining an outer bore within the component and a sleeve at least partially defining the inner bore and positioned within the outer bore. The hollow inner sleeve may facilitate inclusion of a second material having wear or thermal properties that are different from a first material of the component. In at least some embodiments, one of the inner sleeve bore and the outer bore is non-linear at the first thermal condition and linear at the second thermal condition to facilitate cooperating with the thermally compensated bore guide system to reduce wear of the shaft and the inner bore and to reduce fluid leakage between the shaft and the inner bore.

Exemplary embodiments of thermally compensated bore guide systems are described above in detail. The systems and methods are not limited to the specific embodiments described herein, but rather, components of systems and/or steps of methods may be utilized independently and separately from other components and/or steps described herein. For example, the system may also be used in combination with other machines and methods, and is not limited to practice with only an internal combustion reciprocating-piston engine as described herein. Rather, the embodiments can be implemented and utilized in connection with many other machine applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a thermally compensated bore guide system for a machine, the method comprising:
   manufacturing an inner bore defined within a component; and
   positioning a shaft such that at least a portion of the shaft is circumferentially surrounded by the inner bore, wherein the shaft is configured to translate along a longitudinal axis, and wherein:
   the inner bore has a first geometry that is non-linear in response to the component being at a first thermal condition, and the inner bore is configured to change to a second geometry that is linear and to define a bore axis substantially aligned with the longitudinal axis in response to the component being at a second thermal condition, wherein the second thermal condition has a higher temperature than the first thermal condition.

2. The method of claim 1, comprising:
manufacturing an outer bore within the component, the outer bore defined by a sidewall of the component; and
positioning a sleeve within the outer bore, such that the sleeve at least partially defines the inner bore.

3. The method of claim 2, wherein manufacturing the outer bore comprises using a ram electrical discharge machining (EDM) process.

4. The method of claim 2, wherein manufacturing the outer bore comprises forming the sidewall during an additively manufacturing process that initially forms the component.

5. The method of claim 2, further comprising forming the sleeve using at least one of a ram EDM process and an additive manufacturing process.

6. A thermally compensated bore guide system for a shaft, the shaft configured to translate along a longitudinal axis, the thermally compensated bore guide system comprising:
an inner bore defined within a component, the inner bore configured to circumferentially surround at least a portion of the shaft, wherein:
the inner bore has a first geometry that is non-linear in response to the thermally compensated bore guide system being at a first thermal condition, and
the inner bore is configured to change to a second geometry that is linear and to define a bore axis substantially aligned with the longitudinal axis in response to the thermally compensated bore guide system being at a second thermal condition, wherein the second thermal condition has a higher temperature than the first thermal condition.

7. The thermally compensated bore guide system according to claim 6, wherein the thermally compensated bore guide system further comprises:
a sidewall of the component, the sidewall defining an outer bore within the component; and
a sleeve positioned within the outer bore, the sleeve at least partially defines the inner bore.

8. The thermally compensated bore guide system according to claim 7, wherein the outer bore is non-linear at the first thermal condition.

9. The thermally compensated bore guide system according to claim 7, wherein the outer bore is linear at the first thermal condition.

10. The thermally compensated bore guide system according to claim 7, wherein the sleeve comprises at least a first material and the sidewall comprises a second material, wherein the first and second materials are different from one another.

11. The thermally compensated bore guide system according to claim 6, wherein the first geometry of the inner bore has a curvilinear shape along at least a portion of a length of the inner bore.

12. The thermally compensated bore guide system according to claim 6, wherein the bore axis of the inner bore is non-linear when the inner bore has the first geometry at the first thermal condition, wherein the first geometry is designed to enable a transition to the second geometry that is linear to reduce wear between the shaft and the inner bore when operating at the second thermal condition.

13. A machine comprising:
a component comprising a sidewall that defines an outer bore within the component;
a sleeve positioned within the outer bore, the sleeve at least partially defines an inner bore; and
a shaft comprising at least a portion circumferentially surrounded by the inner bore, the shaft configured to translate along a longitudinal axis, wherein:
the inner bore has a first geometry that is non-linear in response to the component being at a first thermal condition, and
the inner bore is configured to change to a second geometry that is linear and to define a bore axis substantially aligned with the longitudinal axis in response to the component being at a second thermal condition, wherein the second thermal condition has a higher temperature than the first thermal condition.

14. The machine according to claim 13, wherein the first thermal condition is associated with at least one of a non-operating condition and an initial startup condition of the machine, and wherein the second thermal condition is associated with a steady-state operating condition of the machine.

15. The machine according to claim 14, wherein the outer bore is non-linear at the first thermal condition.

16. The machine according to claim 14, wherein the outer bore is linear at the first thermal condition.

17. The machine according to claim 14, wherein the sleeve comprises at least a first material and the sidewall comprises a second material, wherein the first and second materials are different from one another.

18. The machine according to claim 13, wherein the first geometry of the inner bore has a curvilinear shape along at least a portion of a length of the inner bore.

19. The machine according to claim 13, wherein the first geometry is designed to enable a transition to the second geometry that is linear to reduce wear between the shaft and the inner bore when operating at the second thermal condition.

20. The machine according to claim 13, wherein the machine is at least one of an internal combustion reciprocating-piston engine and a reciprocating-piston air compressor.

* * * * *